(12) United States Patent
Schacht et al.

(10) Patent No.: US 7,185,074 B2
(45) Date of Patent: Feb. 27, 2007

(54) METHOD OF DISCOVERING AND INSTALLING CLIENTS FOR DIGITAL COPIER SERVICES

(75) Inventors: Bryan Keith Schacht, Laguna Beach, CA (US); Michael Constantin, Irvine, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 652 days.

(21) Appl. No.: 10/261,381

(22) Filed: Sep. 30, 2002

(65) Prior Publication Data
US 2004/0064532 A1 Apr. 1, 2004

(51) Int. Cl.
*G06F 15/177* (2006.01)

(52) U.S. Cl. ............... 709/221; 709/220; 709/217; 709/223; 709/224

(58) Field of Classification Search .......... 709/203, 709/216–218, 220–224, 227–228
See application file for complete search history.

(56) References Cited

U.S. PATENT DOCUMENTS

| | | | |
|---|---|---|---|
| 5,327,526 A | | 7/1994 | Nomura et al. |
| 5,367,673 A | | 11/1994 | Goldsmith et al. |
| 5,580,177 A | * | 12/1996 | Gase et al. ............... 400/61 |
| 5,692,111 A | | 11/1997 | Marbry et al. |
| 5,832,191 A | * | 11/1998 | Thorne ............... 358/1.15 |
| 5,859,969 A | * | 1/1999 | Oki et al. ............... 709/200 |
| 5,862,404 A | | 1/1999 | Onaga |
| 5,931,909 A | * | 8/1999 | Taylor ............... 709/221 |
| 5,960,167 A | | 9/1999 | Roberts et al. |
| 6,094,679 A | * | 7/2000 | Teng et al. ............... 709/220 |
| 6,192,518 B1 | * | 2/2001 | Neal ............... 717/175 |
| 6,301,012 B1 | * | 10/2001 | White et al. ............... 358/1.15 |
| 6,424,424 B1 | * | 7/2002 | Lomas et al. ............... 358/1.14 |
| 6,473,783 B2 | * | 10/2002 | Goshey et al. ............... 709/203 |
| 6,611,880 B1 | * | 8/2003 | Simpson et al. ............... 710/18 |
| 6,647,434 B1 | * | 11/2003 | Kamepalli ............... 710/14 |
| 6,678,750 B2 | * | 1/2004 | Meade et al. ............... 710/7 |
| 6,701,357 B1 | * | 3/2004 | Astarabadi et al. ............... 709/220 |
| 6,789,111 B1 | * | 9/2004 | Brockway et al. ............... 709/222 |

OTHER PUBLICATIONS

"NDS, Novell's Directory Technology," www.novell.com/documentation/lg/nw5/usserver/setupenu/data/hhufqo15.html, at least as early as Jun. 5, 2001.

(Continued)

Primary Examiner—Saleh Najjar
Assistant Examiner—Faruk Hamza
(74) Attorney, Agent, or Firm—Law Office of Karen Dana Oster, LLC

(57) ABSTRACT

The present invention is directed to a network in which a potential user may be notified of the presence of at least one intelligent peripheral device and, upon the potential user's request, his workstation may be configured to use the selected intelligent peripheral device. The present invention is also directed to an installation method for notifying at least one potential user of the availability of at least one intelligent peripheral device and, if requested, configuring potential users' workstations to use the requested intelligent peripheral device. In one preferred embodiment, the method includes the steps of sending an announcement to at least one potential user, receiving a response to the announcement from the potential user, and configuring the potential user's workstation to use the intelligent peripheral device.

29 Claims, 7 Drawing Sheets

OTHER PUBLICATIONS

"Set Up NDS, Novell's Directory Technology," www.novell.com/documentation/lg/nw5/usserver/setupenu/data/hzo65k4x.html, at least as early as Jun. 5, 2001.

"Chapter 7: The Great Puzzle:NetWare 5 Printing," Novell's CNA Study Guide for Netware 5, Dec. 16, 1998, pp. 584-612.

* cited by examiner

METHOD OF DISCOVERING AND INSTALLING CLIENTS FOR DIGITAL COPIER SERVICES

BACKGROUND OF INVENTION

A method and apparatus for discovering and configuring peripheral devices on a network, notifying potential users of the presence of a peripheral device on a network, and conveniently configuring a workstation to use peripheral devices.

Peripheral devices allow users to put information into or get information out of a computer system. Peripheral devices include, but are not limited to, printers, scanners, copiers, and facsimile machines. Earlier generations of peripheral devices performed a single function and had a limited ability to communicate with other devices or process information. Many peripheral devices today, however, are able to perform multiple functions and are capable of sophisticated communications and information processing. A multifunction peripheral ("MFP") is a peripheral device that can perform the functions of more than one traditional peripheral device. For example, a single device that can perform the functions of a printer, scanner, copier, and facsimile machine is an MFP. An intelligent peripheral device ("IPD") is a peripheral device that includes an embedded microprocessor and memory for controlling its operation or for performing other tasks, such as communicating over a network with workstations, server computers, and other peripheral devices. An IPD can sometimes perform the functions of a server and is typically also an MFP.

A typical network ("network") includes a plurality of computer systems and peripheral devices capable of communicating with each other. A network can be a local area network, a wide area network, a plurality of networks, wireless networks, or other type of network. The computer system used by an individual user in a network environment is typically referred to as a "workstation." Other computer systems on a network perform various network services and are referred to as "server computers." The software associated with the computer systems and peripheral devices on a network includes clients and servers. A client is a program (a "process") that sends a message to a server requesting that the server perform a task (a "service"). A server is a process that performs the requested task. While a client and a server may run on the same computer system, the client usually runs on a workstation while the server runs on a server computer dedicated to performing one or more server processes. In addition, a network generally includes a server computer that runs a network operating system, which in turn, provides various network services necessary for managing the network. For example, a network operating system often includes a file server, a print server, e-mail, and a directory server.

A hyperlink or hot link ("link") is a connection between two hypertext objects and generally appears in a document as a highlighted word, phrase, or graphic object. In operation, clicking on a link causes the target object to be displayed. The target object can be a point elsewhere in the document, a Web page, or a service on a server computer. Hypertext transfer protocol ("HTTP") is a widely used protocol for transferring a target object from a server to a client.

When a new peripheral device is physically connected to a network, performing a software setup process is necessary before other devices on the network can communicate with the peripheral device. The setup process involves configuring various network settings, such as Internet protocol ("IP") addresses, Lightweight Directory Access Protocol ("LDAP") server entries, network masks, domain name system ("DNS"), and other similar network settings. After network settings for the peripheral device have been established, the workstations of users who want to use the peripheral device must be configured. This requires identifying potential users of the new peripheral device and installing device drivers on their workstations. For example, when a new printer is connected to a network, network settings for the printer must be configured and a print queue must be established on a print server. Users must be told the names of the print server and print queue and must install device drivers for the peripheral device. To install a device driver, the user typically navigates to the correct server through a directory tree displayed on his workstation, locates the correct print queue, and then double-clicks on the queue name. Similarly, when a new device (e.g. a scanner) is attached to a network, network settings for the device must be configured, and the workstations of users wanting to use the scanner generally must register with a scanner server. In order to register with the scanner server, the user must be made aware of the scanner, its IP address, and the required setup process.

While networks can be small, consisting of a few workstations sharing a single peripheral device, they are typically much larger, often comprising hundreds or even thousands of workstations and peripheral devices. But users generally want to be able to use only the services of peripheral devices that are near their workstations. Networks are complicated by their dynamic nature, with workstations and peripheral devices being frequently added and removed, and by the frequent release of new versions of software (such as device drivers) that must be installed on server computers and workstations. In addition, when a peripheral device is assigned a new IP address, subnet mask, gateway, or DNS server, the setup configuration of the workstations with which the device communicates must be updated.

The size and dynamic nature of many networks make it difficult for systems administrators to set up and maintain workstations so that users are able to use nearby peripheral devices. This task could be left to the user, but proper setup and maintenance of workstation configurations requires some level of expertise. The user must be able to navigate through an often complex series of steps to locate and install the software necessary to communicate with the peripheral device. Another problem is that many users, even if technically sophisticated, are unwilling to perform these steps because they are time-consuming. Users want to be able to use a peripheral device in a simple and transparent manner. If the setup process is complex or time-consuming or doesn't go smoothly, a time-pressed user will simply abandon the attempt to set up the peripheral device. Moreover, the user needs to be informed each time a peripheral device is added to or removed from the network. And finally, the user needs to be informed each time a new version of software required to use a peripheral device is released.

To simplify and standardize the setup and maintenance process, several protocols have been developed that coordinate the configuration of computer systems and peripheral devices on a network ("configuration protocols"). Prominent configuration protocols that have been proposed or are in use today include Service Location Protocol ("SLP"); Jini; Universal Plug and Play ("UPnP"); and Universal Description, Discovery, and Integration ("UDDI").

SLP is an Internet Engineering Task Force ("IETF") standard that provides a framework for network-based applications to discover the location of a service. SLP requires a Directory Agent, a Service Agent, and a User Agent. The Directory Agent stores information about services available on the network, including their network addresses. A Service Agent advertises a service. A User Agent discovers services for its client. In operation, Service Agents register with the Directory Agent, and a User Agent that wants to use a service contacts the Directory Agent. Service and User Agents learn the location of the Directory Agents in several ways. First, Service and User Agents can multicast a request to the network, and a Directory Agent that hears the request can reply. Second, a Directory Agent can multicast an advertisement of its location to the network. Third, Service and User Agents learn the location of the Directory Agent using Dynamic Host Configuration Protocol ("DHCP"). If there is no Directory Agent on the network, a User Agent that wants to use a service broadcasts its request to the network repeatedly; a Service Agent capable of providing the requested service will respond and fulfill the request. A drawback of SLP is that it requires that the described Agents be running on the network. A further drawback of SLP is that only network-based applications are able to discover the locations of services.

Sun Microsystems' Jini architecture is similar to SLP, but it is based on the Java language and is object-oriented. When a peripheral device is attached to a network, it broadcasts a message to the network requesting that all Lookup Services on the network identify themselves. The peripheral device then registers with responding Lookup Services. A workstation that wants to use a service locates one by sending a list of desired attributes to the Lookup Service. In response, the Lookup Service sends the workstation an object for a service that satisfies the requested criteria. The workstation uses the object to request the service from the peripheral device. A drawback of Jini is that it generally requires that a Lookup Service be running on the network.

UPnP is a framework for the configuration of network devices that is defined at the network transport layer (transmission control protocol ("TCP")/IP layer). UPnP requires that device manufacturers build application program interfaces ("APIs") for their devices that implement UPnP protocols. When a device capable of controlling other devices is attached to a network, it broadcasts a message to the network requesting that all devices on the network announce their presence. When a device that only provides a service is attached to the network, it sends an advertisement of its presence to the network. While UPnP provides the protocol support for configuring devices on a network, a drawback of UPnP is that it doesn't provide a simple method for a user to configure network devices. To set up and maintain workstations so that they are configured to use the services of nearby peripheral devices, UPnP requires software at the network application layer.

Examples of patent references directed to configuring workstations to use the services of nearby peripheral devices are given below.

U.S. Pat. No. 5,960,167 to Roberts et al. (the "Roberts reference") discloses a method for configuring a printer on a network and enabling workstations to use the printer. When a new printer is added to the network, it broadcasts an advertisement to the network. The advertisement is stored in a table, which an auto-install utility periodically reads to see whether new printers have been added to the network. If the auto-install utility discovers a new printer, it configures the printer and creates a print queue, a print server, a printer object, and a printer agent. The Roberts reference is limited in that it requires the auto-install utility to be run on a periodic basis; it also requires a print service manager and service registry service. These requirements add considerable overhead and complexity to a network. Further, the Roberts reference requires a server computer to run a shared printer driver.

U.S. Pat. No. 5,692,111 to Marbry et al. (the "Marbry reference") discloses a method that permits a user to print to a printer on a network even if that printer's configuration information and printer driver are not installed on the user's workstation. Printer-configuration information and printer drivers are stored on a network server. The user identifies a network printer when requesting a print job or running a printer-installation wizard. Configuration information and a printer driver are copied from the network server to the user's workstation. A drawback of the Marbry reference is that the user must know the location of the server and print queue to configure a printer. To learn the location of the server and print queue, the user must search through a directory structure. This process can be burdensome and confusing because the user may have to search through hundreds of printers hidden in dozens of folders that are given arcane, technically oriented names assigned by a system administrator. A further limitation of the Marbry reference is that the user is not made aware of nearby printers that are newly attached to the network.

BRIEF SUMMARY OF THE INVENTION

The present invention is directed to a network in which a potential user may be notified of the presence of at least one intelligent peripheral device and, upon the potential user's request, his workstation may be configured to use the selected intelligent peripheral device. The network preferably includes at least one intelligent peripheral device communicatively coupled to the network. In one preferred embodiment, each of the intelligent peripheral devices includes a device memory for storing a process for determining potential users of the intelligent peripheral device and sending an announcement (e.g. an e-mail message, a chat message, and/or a broadcast message) to each potential user. The device memory also may be used for storing a message protocol and a protocol for linking a target object to a client. In one preferred embodiment, each of the workstations is communicatively coupled to the network. Each workstation also preferably includes a workstation memory for storing the message protocol and the protocol for linking to a target object to a client. Preferably, the network also includes at least one deployment server computer for serving the target object to the workstations, the deployment server computer communicatively coupled to the network.

The present invention is also directed to an installation method for notifying at least one potential user of the availability of at least one intelligent peripheral device and, if requested, configuring potential users' workstations to use the requested intelligent peripheral device. In one preferred embodiment, the method includes the steps of sending an announcement to at least one potential user, receiving a response to the announcement from the potential user, and configuring the potential user's workstation to use the intelligent peripheral device.

In one preferred embodiment, the method includes the following steps: examining an all-users file stored in a directory server; creating and storing a potential-users file in the directory server having a network address; providing at least one intelligent peripheral device with the network address of the directory server; getting at least one potential user from the potential-users file; determining whether the potential user is a current user; determining whether the potential user has previously declined an offer to have at least one workstation configured to use the at least one intelligent peripheral device; sending an announcement to the at least one potential user; receiving a response to the announcement; determining whether the at least one potential user wants to have the at least one workstation configured to use the at least one intelligent peripheral device; determining whether the at least one potential user wants to have the at least one workstation configured to use the at least one intelligent peripheral device at a later time; configuring the at least one workstation to use the at least one intelligent peripheral device; and adding the at least one potential user to a current-users file.

The foregoing and other objectives, features, and advantages of the invention will be more readily understood upon consideration of the following detailed description of the invention, taken in conjunction with the accompanying drawings.

DETAILED DESCRIPTION OF THE INVENTION

The present invention is directed to a system and method for potential users of an IPD on a network to discover the availability of the device and to a simplified process for users to configure their workstations to use the IPD. The present invention also includes a method for current users of an IPD on a network to discover the availability of service upgrades and for upgrading the service level of workstations. In addition, the present invention is directed to a network in which users can discover IPDs or the availability of service upgrades, configure workstations to use the IPD, and upgrade the service level of workstations.

Figure 1:
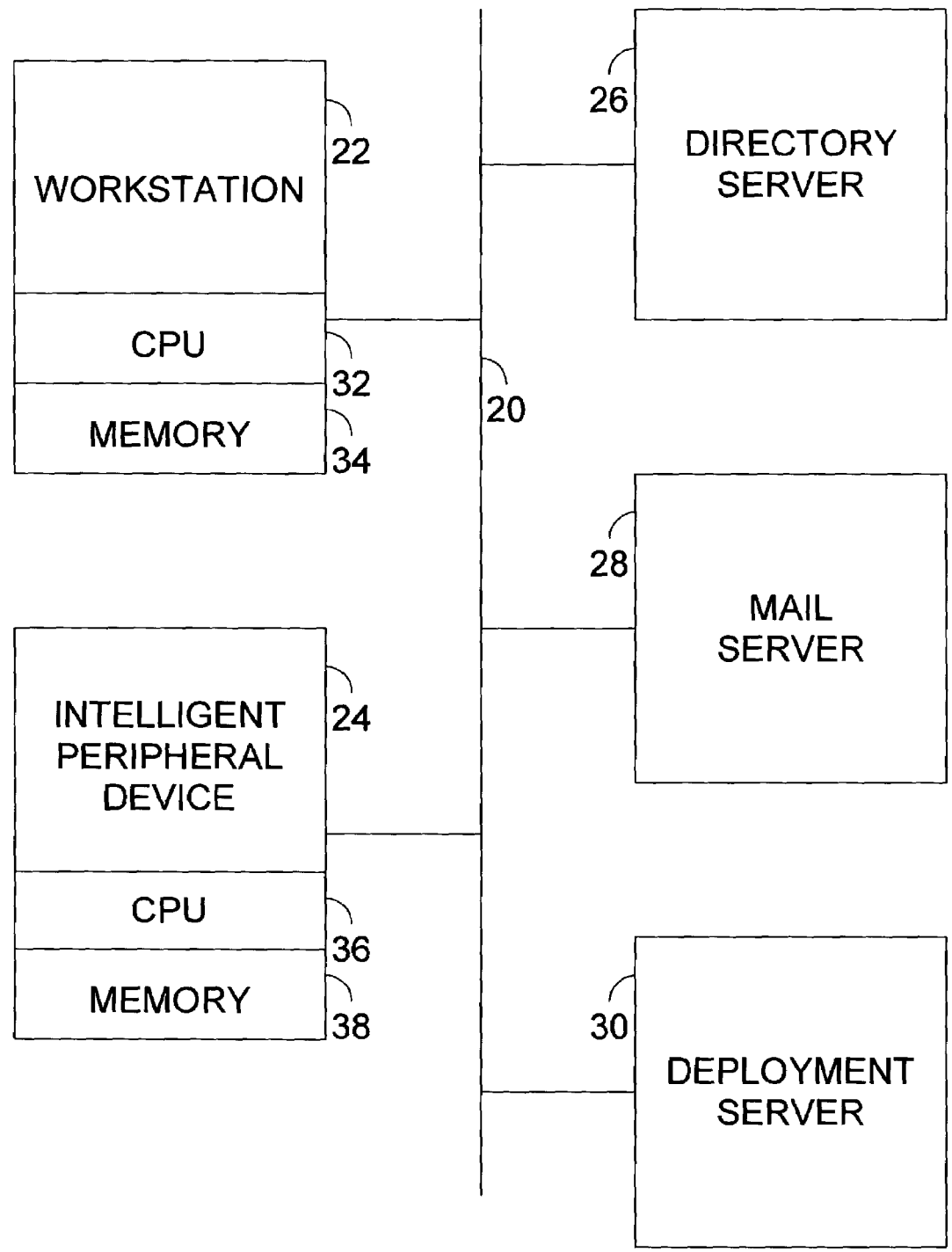
FIG. 1 is a block diagram of a network of one preferred embodiment of the present invention.

FIG. 1 is a block diagram of a network 20 in an exemplary embodiment of the present invention. The network 20 includes a workstation 22, an IPD 24, a directory server 26, a mail server 28, and a deployment server 30, each device communicatively coupled to the network 20. The workstation 22 includes a CPU 32 and a memory 34. The memory 34 stores software required to communicate with other devices on the network 20. In a preferred embodiment, the workstation 22 runs clients that obtain services provided by servers on the network 20. The memory 34 preferably stores software that supports e-mail and linking to Web pages. In a preferred embodiment, the memory 34 stores software that supports SMTP and HTTP. The IPD 24 includes a CPU 36 and a memory 38 for storing software required to communicate with other devices on the network 20. The memory 38 preferably stores software that supports e-mail and serving Web pages. In a preferred embodiment, the IPD 24 is configured to work with a mail server 28 using SMTP, a directory server 26 using the LDAP, the deployment server 30 using HTTP, and other appropriate network protocols. In an additional preferred embodiment, the IPD 24 is an MFP. The directory server 26 is a server computer that stores information concerning all devices on the network 20 and provides a device-information service to clients. In one preferred embodiment, directory server 26 stores an all-workstations file 40 (described below). The mail server 28 is a server computer that provides clients an e-mail service. In one preferred embodiment, mail server 28 supports SMTP. The deployment server 30 is a server computer that stores client code and device drivers that are necessary for a workstation 22 to use an IPD 24 and provides a configuration service to clients. Workstations 22 may have different operating systems and other features that require unique client code and device drivers. The deployment server 30 preferably stores all versions of client code and device drivers that may be required. In one alternative preferred embodiment, the configuration service provided by deployment server 30 runs on the IPD 24. The deployment server 30 preferably supports HTTP. If a user of a client workstation 22 clicks on a link to a target object supported by the deployment server 30, a configuration process is delivered to and automatically executed on the client workstation 22.

Figure 2:
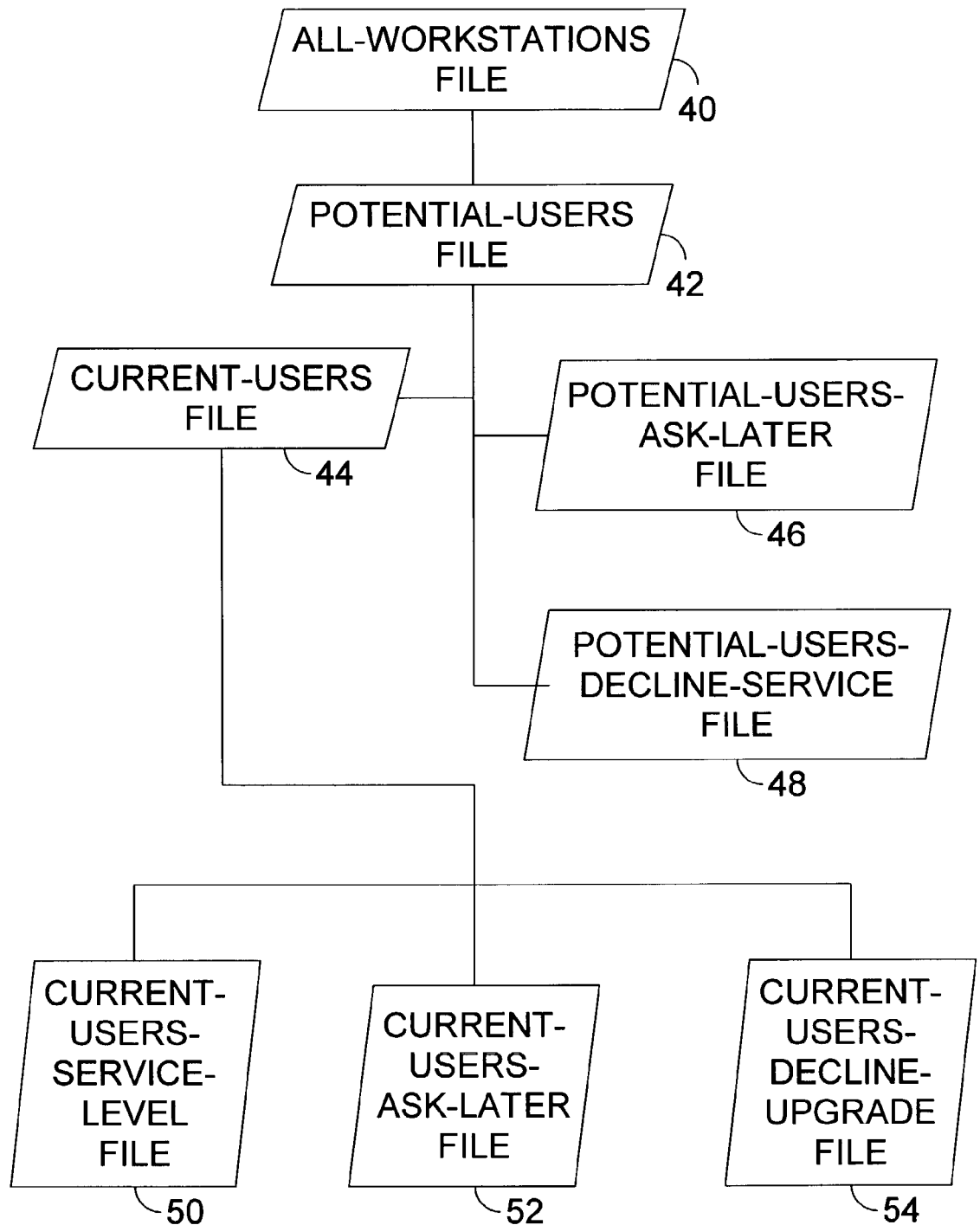
FIG. 2 is a block diagram showing the file structure of one preferred embodiment of the present invention.

As shown in FIG. 2, one preferred embodiment of the present invention contemplates eight types of files. An all-workstations file 40 is stored on the directory server 26 and contains information about all workstations 22 on the network 20. A potential-users file 42 is created as a result of the process described below and shown in FIG. 3. The potential-users file 42 is preferably stored in the memory 34 of IPD 24, but in an alternative preferred embodiment it is stored in the directory server 26. In addition, the present invention contemplates a current-users file 44, a potential-users-ask-later file 46, and a potential-users-decline-service file 48. Files 44, 46, and 48 are created as a result of the process shown in FIGS. 4A, 4B and further described below. Finally, the present invention contemplates a current-users-service-level file 50, a current-users-ask-later file, and a current-users-decline-upgrade file 54. Files 50, 52, and 54 are created as a result of the process shown in FIGS. 5A, 5B and further described below. Files 44, 46, 48, 50, 52, and 54 are stored in the directory server 26 or in memory 34 of IPD 24.

While the description of the present invention is made with respect to the files described in the preceding paragraph, these files are exemplary. It is contemplated that more or fewer than eight file types could be used. Further, the locations where the files are stored are exemplary. The files may be stored in any memory location accessible over the network 20. The important factor is that the information necessary to perform the method is stored in a location available to the services described below.

The method of the present invention can be divided into three submethods. First, there is a method for creating a potential-users file 42 (see FIG. 3). Second, there is a method in which a potential user discovers the availability of and configures a workstation 22 to use the IPD 24 (see FIGS. 4A, 4B). Third, there is a method in which a current user discovers the availability of a service upgrade and configures a workstation 22 to use the upgrade (see FIGS. 5A, 5B). These methods are described below.

Figure 3:
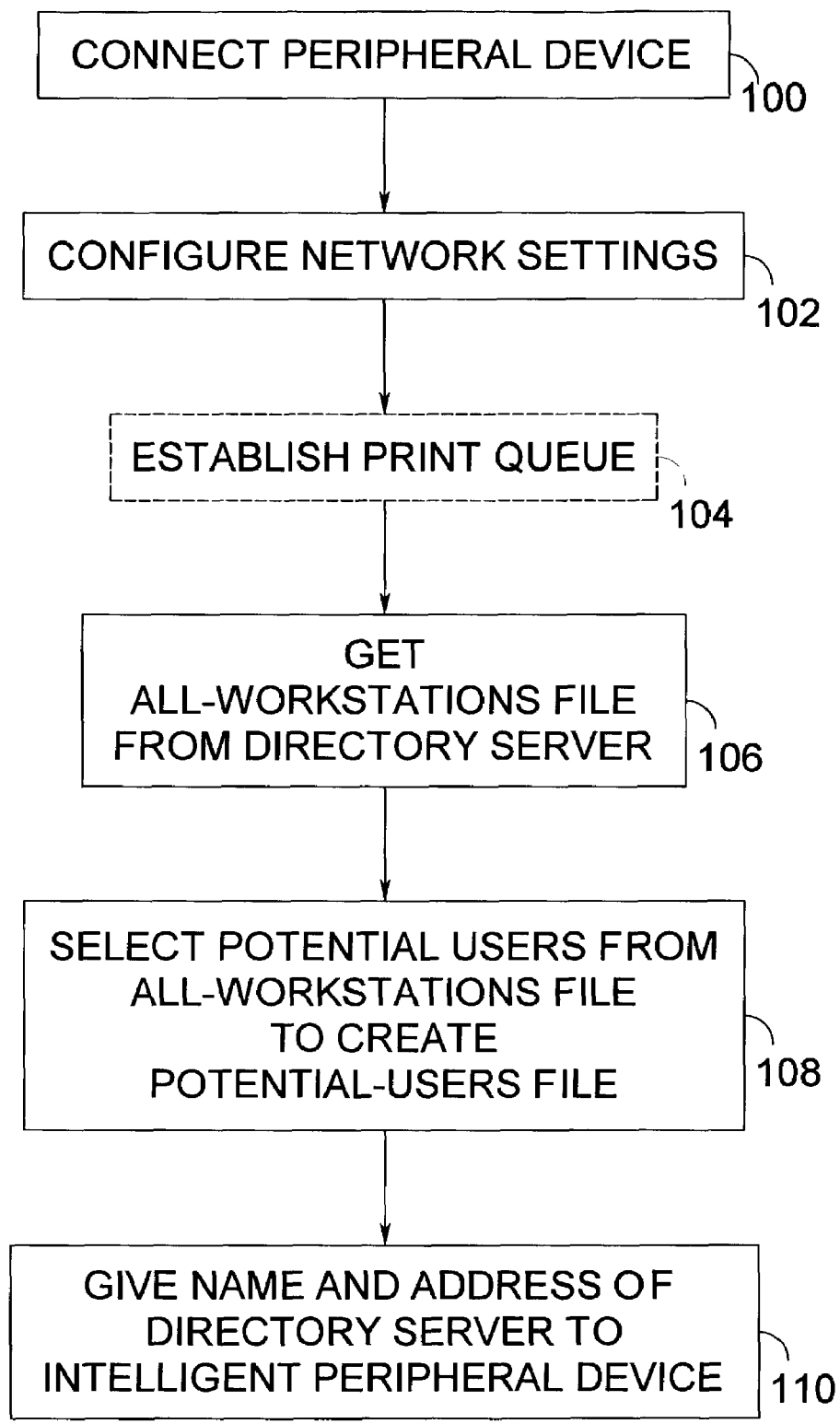
FIG. 3 is a flow diagram of an exemplary method for creating a potential-user file according to one preferred embodiment of the present invention.

FIG. 3 is a flowchart illustrating the steps that are performed in the preferred embodiment of the method of the present invention to create a potential-users file 42. Initially, an IPD 24 is connected to the network 20 (step 100). Network settings required to enable the IPD 24 to communicate with other devices on the network 20 are configured (step 102). In a preferred embodiment, the IPD 24 is configured to work with a mail server 28 using SMTP, a directory server 26 using LDAP, a deployment server 30 using HTTP, and other appropriate network protocols. If the IPD 24 has a print capability, a print queue (optional step 104) is established. The all-workstations file 40 is obtained (step 106), and workstations 22 in close physical proximity to the IPD 24 are selected to create a potential-users file 42 (step 108). It should be understood that physical proximity is an exemplary criterion and that other criteria (such as the particular functions of the IPD 24) may be used to select potential users. In an alternative preferred embodiment, workstations 22 of potential users are marked on the all-workstations file 40. The IPD 24 is provided with the location of the potential-users file 42 or a marked all-workstations file 40 (step 110). In one preferred embodiment, the IP address of the directory server 26 is provided to the IPD 24. In an alternative preferred embodiment, a copy of the potential-users file 42 is provided to the IPD 24. The steps performed to create a potential-users file 42 may be performed by a systems administrator. In an alternative embodiment, the steps performed to create a potential-users file 42 may be performed by software.

Figure 4A:
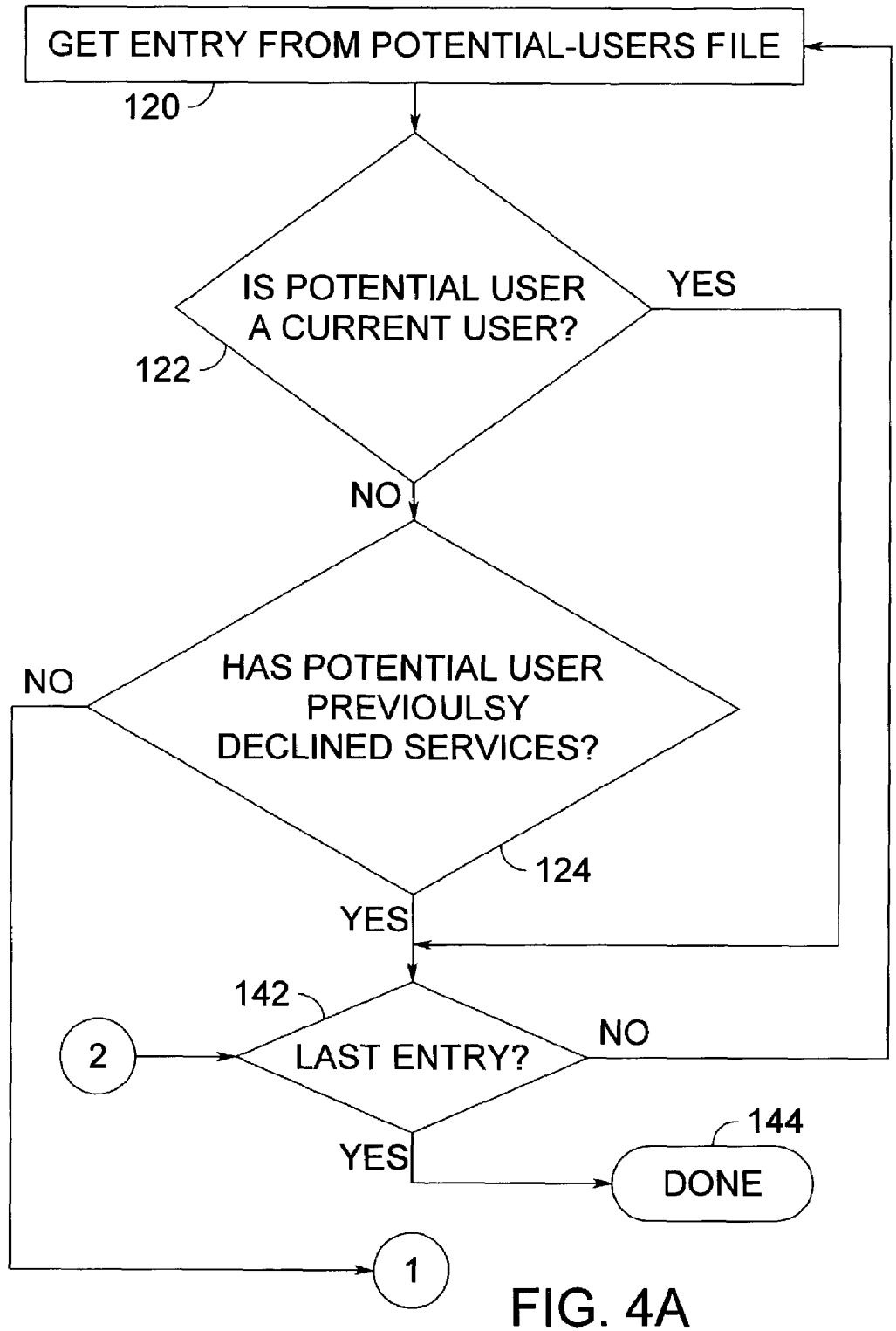
FIGS. 4A, 4B show a flow diagram of an exemplary method for potential users to discover an IPD and for configuring workstations to use the IPD according to one preferred embodiment of the present invention.
Figure 4B:
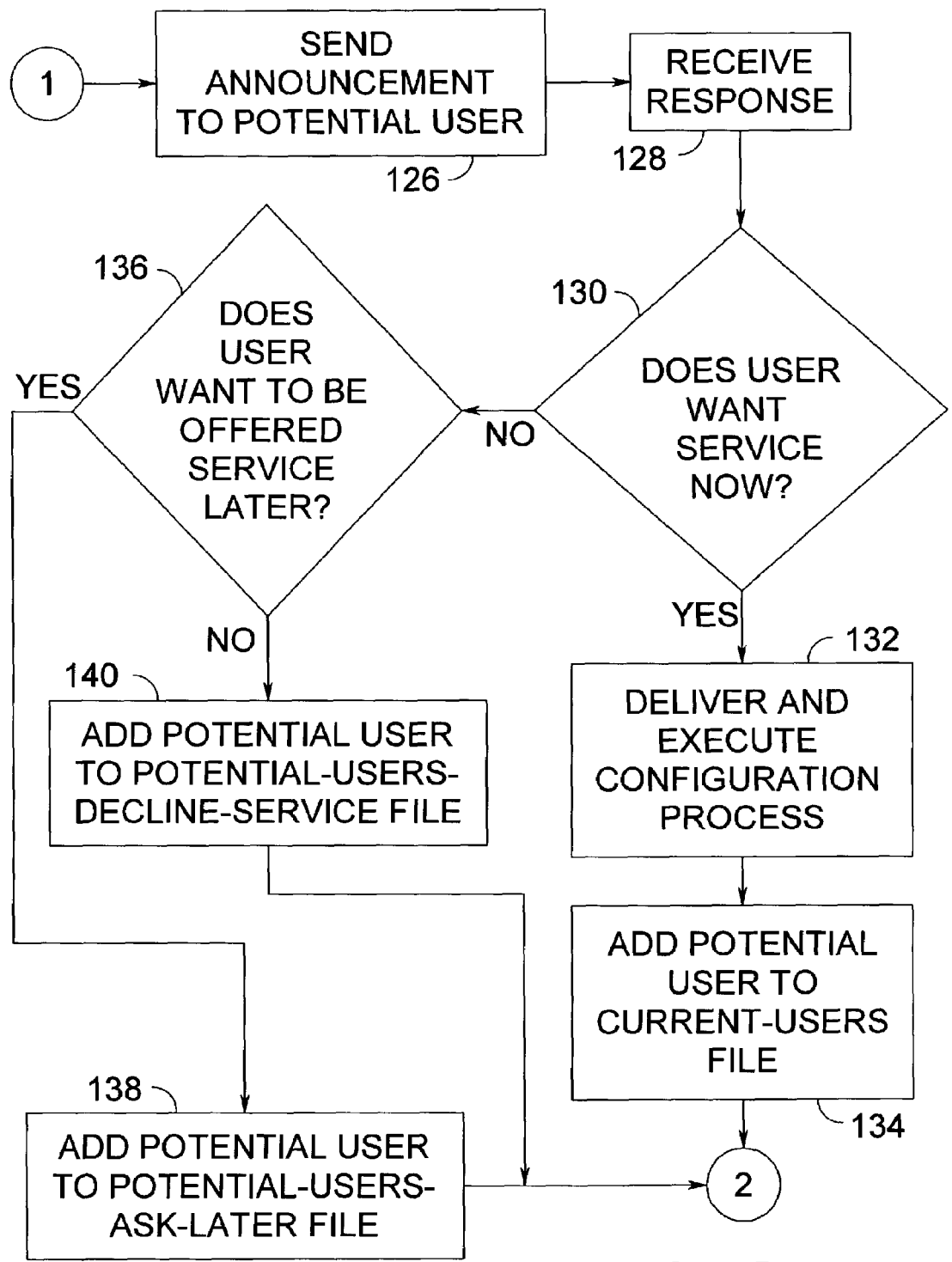

FIGS. 4A and 4B show a flowchart illustrating the steps that are performed in a preferred embodiment of the method of the present invention for a potential user to discover an IPD 24 and configure a workstation 22 to use the IPD 24. Initially, an entry (representing a potential user) is obtained from the potential-users file 42 (step 120). A check is made to see if the potential user was previously set up to use the IPD 24 (step 122). If the potential user was not previously set up to use the IPD 24, a check is made to see if the potential user previously declined an offer to have his workstation 22 configured to use the IPD 24 (step 124). If the potential user did not previously decline an offer to have his workstation 22 configured, an announcement is sent to the potential user (step 126). The announcement preferably includes a link to a configuration service provided by deployment server 30. The response of the potential user is received (step 128) and checked to see if the potential user wants to have his workstation 22 configured (step 130). A potential user indicates that he wants to have his workstation 22 configured by simply clicking on the link included in the announcement; in response, a configuration process is delivered to and automatically executed on the specified workstation 22 (step 132). The potential user is added to the current-users file 44 (step 134). If the potential user does not wish to have his workstation 22 set up to use the IPD 24, a check is made to see if the potential user would like to be offered the link at a later time (step 136). If the potential user wants to be offered the ability to configure his workstation 22 later, the potential user is added to a potential-users-ask-later file 46 (step 138). If the potential user does not want to be offered the ability to configure his workstation 22 later, the potential user is added to the current-users-decline-service file 48 (step 140). After any step is performed, and if further steps of this method are not appropriate, a check is made to see if this potential user is the last entry (step 142). If there are additional entries in the potential-user file 42, the method is repeated for each entry. If there are no further entries, the method is complete (step 144).

Figure 5A:
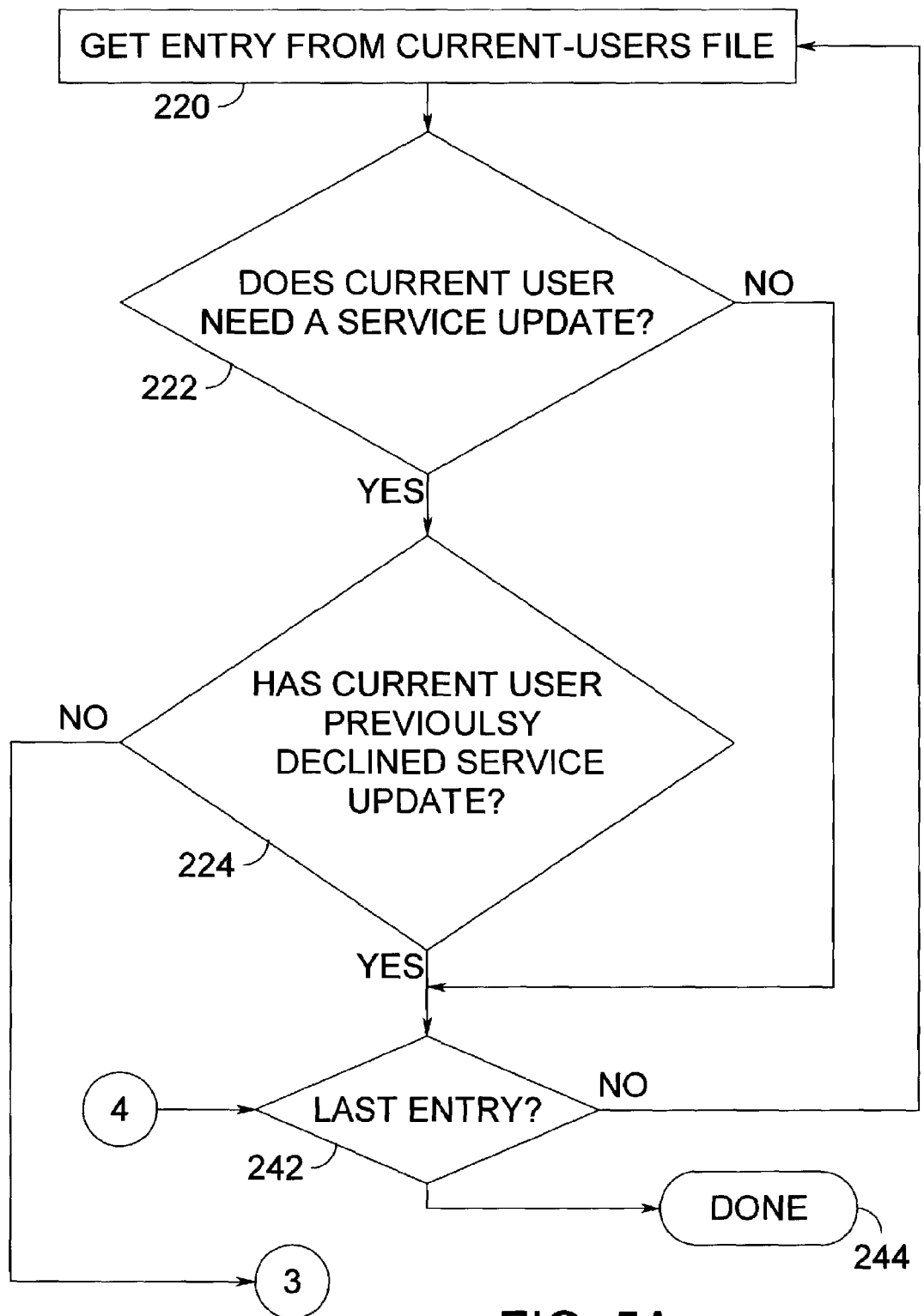
FIGS. 5A, 5B show a flow diagram of an exemplary method for potential users to discover that a service upgrade for an IPD is available and for upgrading the service level of workstations according to one preferred embodiment of the present invention.
Figure 5B:
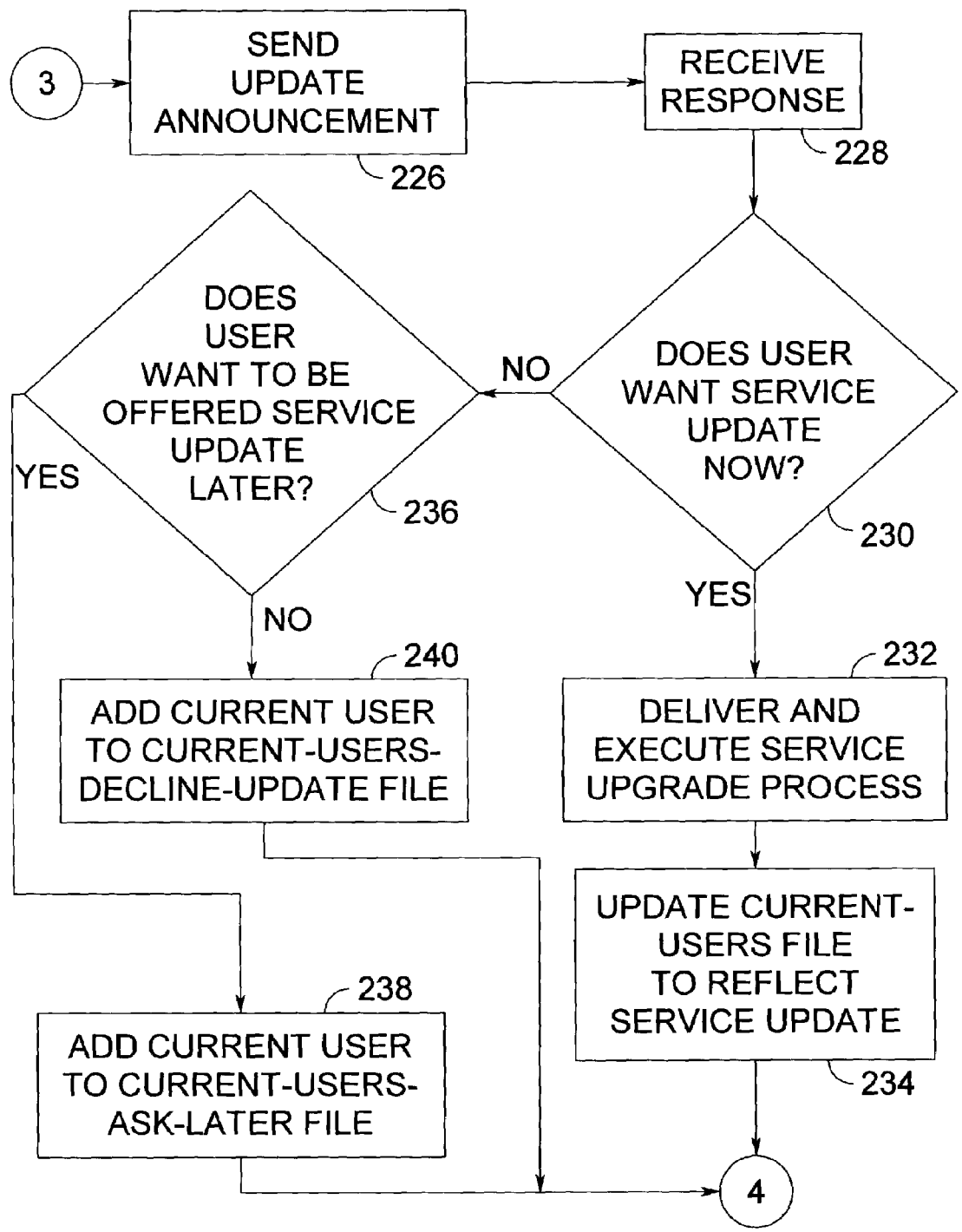

FIGS. 5A, 5B show a flowchart illustrating the steps that are performed in a preferred embodiment of the method of the present invention for a current user of an IPD 24 to discover the availability of a service upgrade and for upgrading the service level of a workstation 22. This method may be used when a developer issues a new version of a device driver, new functions become available on the IPD 24, an IPD 24 is removed from the network 20, or a configuration upgrade is otherwise required. An entry is obtained from the current-users file 44 (step 220). A check is made to see if the current user needs a service update (step 222). If the current user needs a service update, a check is made to see if the current user has previously declined a service update (step 224). If the current user needs a service update and has not previously declined a service update, the current user is sent an update announcement (step 226). The update announcement preferably includes a link to an update service provided by deployment server 30. A response from the current user is received (step 228), and a check is made to see whether the current user wants the service update (step 230). A current user indicates that he wants to have the service update installed on his workstation 22 simply by clicking the update link included in the update announcement. In response to the user's clicking on the update link, a service upgrade process is delivered to and automatically executed on the specified workstation 22 (step 232). The current-users file 44 is updated to reflect the service level update (step 234). If the current user does not want the update immediately, a check is made to see if the current user would like the update performed later (step 236). If the current user would like the update performed later, the current user is added to the current-users-ask-later file 52 (step 238). If the current user does not want to be offered a service update later, the current user is added to the current-users-decline-update file 54 (step 240). After steps 222, 224, 234, 238, and 240, if further steps in the method are not appropriate, a check is made to see if the current user is the last entry in the current-users file 44 (step 242). If there are additional entries in the current-users file, the method is repeated for each entry. If there are no further entries, the method is complete (step 244).

The terms and expressions that have been employed in the foregoing specification are used as terms of description, not of limitation, and are not intended to exclude equivalents of the features shown and described or portions of them. The scope of the invention is defined and limited only by the claims that follow.

What is claimed is:

1. In a network comprising a directory server, a mail server, a deployment server, at least one workstation, and at least one intelligent peripheral device, an installation method for notifying at least one potential user that said at least one intelligent peripheral device is available and configuring said at least one workstation to use said at least one intelligent peripheral device, said installation method comprising the steps of:

(a) providing said at least one intelligent peripheral device access to a potential-users file, said potential-users file having at least one entry representing a potential user at a workstation on said network;

(b) sending an announcement from an intelligent peripheral device having means for communicating with other devices on a network to at least one potential user represented as an entry in said potential-users file;

(c) receiving at said intelligent peripheral device a response from said at least one potential user to said announcement; and (d) configuring said workstation associated with said at least one potential user to use said intelligent peripheral device.

2. The installation method of claim 1, further comprising the step of determining whether said at least one potential user is a current user.

3. The installation method of claim 1, further comprising the step of determining whether said at least one potential user is included in a potential-users-decline-service file.

4. The installation method of claim 1, further comprising the step of determining whether said at least one potential user wants to have said at least one workstation configured to use said at least one intelligent peripheral device.

5. The installation method of claim 1, further comprising the step of determining whether said at least one potential user wants to have said at least one workstation configured to use services of said at least one intelligent peripheral device at a later time.

6. The installation method of claim 5, further comprising the step of sending a subsequent announcement to said at least one potential user at a later time.

7. The installation method of claim 1, wherein said step of sending said announcement further comprises the step of sending a link to a configuration service.

8. The installation method of claim 7, further comprising the step of clicking on said link.

9. The installation method of claim 7, further comprising the step of configuring at least one workstation to use said at least one intelligent peripheral device in response to said clicking on said link.

10. The installation method of claim 1, further comprising the step of adding said potential user to a current-users file.

11. The installation method of claim 1, wherein the step of sending an announcement to said at least one potential user further comprises the step of sending said at least one potential user an e-mail message.

12. The installation method of claim 1, wherein the step of sending an announcement to said at least one potential user further comprises the step of sending a chat message.

13. The installation method of claim 1, wherein the step of sending an announcement to said at least one potential user further comprises the step of sending a broadcast message.

14. The installation method of claim 1, wherein said step of configuring at least one workstation is a configuration service provided by means remote from said at least one workstation.

15. The installation method of claim 1, wherein said step of receiving a response to said announcement further comprises the step of receiving a response to said announcement from said at least one workstation, and wherein said step of configuring at least one workstation is a configuration service provided by means remote from said at least one workstation.

16. In a network comprising a directory server, a mail server, a deployment server, at least one workstation, and at least one intelligent peripheral device, an installation method for notifying at least one potential user that said at least one intelligent peripheral device is available and configuring said at least one workstation to use said at least one intelligent peripheral device, said installation method comprising the steps of:

(a) examining an all-users file;

(b) creating and storing a potential-users file;

(c) providing at least one intelligent peripheral device having access to said all-users file and said potential-users file;

(d) obtaining an entry representing at least one potential user from said potential-users file;

(e) determining whether said potential user is a current user;

(f) determining whether said potential user has previously declined an offer to have at least one workstation configured to use said at least one intelligent peripheral device;

(g) sending an announcement from said intelligent peripheral device having means for communicating with other devices on a network to said at least one potential user at a workstation on said network;

(h) receiving at said intelligent peripheral device a response from said at least one potential user to said announcement;

(i) determining whether said at least one potential user wants to have said at least one workstation configured to use said at least one intelligent peripheral device;

(j) determining whether said at least one potential user wants to have said at least one workstation configured to use said at least one intelligent peripheral device at a later time;

(k) configuring said at least one workstation to use said at least one intelligent peripheral device; and (l) adding said at least one potential user to a current-users file.

17. The installation method of claim 16, wherein said step of configuring said at least one workstation is a configuration service provided by means remote from said at least one workstation.

18. The installation method of claim 16, wherein said step of receiving a response to said announcement further comprises the step of receiving a response to said announcement from said at least one workstation, and wherein said step of configuring at least one workstation is a configuration service provided by means remote from said at least one workstation.

19. A network in which at least one potential user is notified of the presence of at least one intelligent peripheral device and at least one workstation is conveniently configured to use said at least one intelligent peripheral device, said network comprising:

(a) at least one intelligent peripheral device communicatively coupled to said network, said at least one intelligent peripheral device including a device memory, said device memory for storing a process for determining potential users of said intelligent peripheral device, said device memory for storing a process for sending an announcement to each said potential user, and said device memory for storing a message protocol and a protocol for linking a target object to a client, said target object being a process for configuring a workstation to use said at least one intelligent peripheral device;

(b) at least one workstation, said at least one workstation communicatively coupled to said network, said at least one workstation including a workstation memory for storing said message protocol and said protocol for linking to a target object to a client; and (c) at least one deployment server remote from said at least one workstation for delivering said target object to said at least one workstation and automatically executing said target object on said at least one workstation, said at least one deployment server communicatively coupled to said network.

20. The network of claim 19, wherein said message protocol is SMTP.

21. The network of claim 19, wherein said protocol for linking a target object to a client is HTTP.

22. The network of claim 19, wherein said deployment server is integral with said intelligent peripheral device.

23. The network of claim 19, wherein said intelligent peripheral device is a multifunction peripheral device.

24. An intelligent peripheral device for use in a network, said network comprising at least one workstation associated a user, said intelligent peripheral device communicatively coupled to said network, and said at least one workstation communicatively coupled to said network, said at least one intelligent peripheral device comprising:
   (a) said at least one intelligent peripheral device having a device CPU and a device memory;
   (b) a potential-users file accessible by said at least one intelligent peripheral device;
   (c) a process stored in said device memory for determining potential users of said intelligent peripheral device by accessing said potential-users file, said potential-users file having at least one entry representing a potential user;
   (d) a process stored in said device memory for sending an announcement to at least one potential user having an entry in said potential-users file;
   (e) means for receiving a response to said announcement from a potential user; and
   (f) a deployment server accessible by said at least one intelligent peripheral device, said deployment server for providing configuration services to workstations based on responses of said potential users.

25. The intelligent peripheral device of claim 24 wherein said potential-users file is stored in said device memory of said at least one intelligent peripheral device.

26. The intelligent peripheral device of claim 24 wherein said process stored in said device memory for sending an announcement is a process stored in said device memory for sending an e-mail message.

27. The intelligent peripheral device of claim 24 wherein said configuration service is provided a deployment server running on said intelligent peripheral device.

28. The intelligent peripheral device of claim 24 wherein said deployment server is integral with said intelligent peripheral device.

29. An intelligent peripheral device for use in a network, said network comprising at least one workstation associated a user, said intelligent peripheral device communicatively coupled to said network, and said at least one workstation communicatively coupled to said network, said at least one intelligent peripheral device comprising:
   (a) said at least one intelligent peripheral device having a device CPU and a device memory;
   (b) a potential-users file stored in said device memory of said at least one intelligent peripheral device, said potential-users file accessible by said at least one intelligent peripheral device;
   (c) a process stored in said device memory for determining potential users of said intelligent peripheral device by accessing said potential-users file, said potential-users file having at least one entry representing a potential user;
   (d) a process stored in said device memory for sending an e-mail message to at least one potential user having an entry in said potential-users file;
   (e) means for receiving a response to said announcement from a potential user; and
   (f) a deployment server integral with said intelligent peripheral device, said deployment server accessible by said at least one intelligent peripheral device, said deployment server for providing configuration services to workstations based on responses of said potential users.

* * * * *

UNITED STATES PATENT AND TRADEMARK OFFICE
CERTIFICATE OF CORRECTION

PATENT NO. : 7,185,074 B2  Page 1 of 1
APPLICATION NO. : 10/261381
DATED : February 27, 2007
INVENTOR(S) : Bryan Keith Schacht and Michael Constantin It is certified that error appears in the above-identified patent and that said Letters Patent is hereby corrected as shown below:

Column 4,
Line 47, "linking to a target object to a client" should read --linking a target object to a client--.

Column 6,
Line 46, "current-users-ask-later file," should read -- current-users-ask-later file 52,--.

Column 9,
Line 30, "claim 7" should read --claim 8--.

Column 11,
Lines 13-14, "associated a user" should read --associated with a user--.

Column 12,
Lines 9-10, "associated a user" should read --associated with a user--.

Signed and Sealed this

Twenty-sixth Day of June, 2007

JON W. DUDAS
*Director of the United States Patent and Trademark Office*